(12) United States Patent
Wang

(10) Patent No.: US 8,508,830 B1
(45) Date of Patent: Aug. 13, 2013

(54) QUANTUM DOT NEAR-TO-EYE DISPLAY

(75) Inventor: Chia-Jean Wang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 13/107,732

(22) Filed: May 13, 2011

(51) Int. Cl.
*G02F 1/153* (2006.01)

(52) U.S. Cl.
USPC .......................................................... 359/267

(58) Field of Classification Search
USPC ................. 359/242, 245, 265, 315, 620, 267; 399/4, 6; 353/11, 12, 26 A, 27 R; 345/8, 345/156, 158, 419, 589, 633; 349/2, 7, 8, 349/11, 13, 16, 143; 977/759, 834, 932, 977/952, 953
See application file for complete search history.

(56) References Cited

U.S. PATENT DOCUMENTS

| | | | |
|---|---|---|---|
| 4,806,011 A | 2/1989 | Bettinger | |
| 5,943,171 A | 8/1999 | Budd et al. | |
| 6,081,304 A | 6/2000 | Kuriyama et al. | |
| 6,207,229 B1 | 3/2001 | Bawendi et al. | |
| 6,251,303 B1 | 6/2001 | Bawendi et al. | |
| 6,306,610 B1 | 10/2001 | Bawendi et al. | |
| 6,319,426 B1 | 11/2001 | Bawendi et al. | |
| 6,322,901 B1 | 11/2001 | Bawendi et al. | |
| 6,326,144 B1 | 12/2001 | Bawendi et al. | |
| 6,426,513 B1 | 7/2002 | Bawendi et al. | |
| 6,444,143 B2 | 9/2002 | Bawendi et al. | |
| 6,501,091 B1 | 12/2002 | Bawendi et al. | |
| 6,602,671 B1 | 8/2003 | Bawendi et al. | |
| 6,617,583 B1 | 9/2003 | Bawendi et al. | |
| 6,696,299 B1 | 2/2004 | Empedocles et al. | |
| 6,774,361 B2 | 8/2004 | Bawendi et al. | |
| 6,787,810 B2 * | 9/2004 | Choi et al. | 257/82 |
| 6,803,719 B1 | 10/2004 | Miller et al. | |
| 6,855,551 B2 | 2/2005 | Bawendi et al. | |
| 6,861,155 B2 | 3/2005 | Bawendi et al. | |
| 6,890,777 B2 | 5/2005 | Bawendi et al. | |
| 6,914,265 B2 | 7/2005 | Bawendi et al. | |
| 6,921,496 B2 | 7/2005 | Anderson et al. | |
| 7,049,148 B2 | 5/2006 | Bawendi et al. | |
| 7,125,605 B2 | 10/2006 | Bawendi et al. | |
| 7,150,910 B2 | 12/2006 | Eisler et al. | |
| 7,181,266 B2 | 2/2007 | Frangioni et al. | |
| 7,190,870 B2 | 3/2007 | Sundar et al. | |
| 7,229,690 B2 | 6/2007 | Chan et al. | |

(Continued)

OTHER PUBLICATIONS

Kasai, I., Tanijiri, Y., Endo, T., and Ueda, H., "A Forgettable Near Eye Display," Optics Technology Division, Minolta Co., Ltd.; The Fourth International Symposium on Wearable Computers, 2000, pp. 115-118.

(Continued)

*Primary Examiner* — Alessandro Amari
*Assistant Examiner* — Jie Lei
(74) *Attorney, Agent, or Firm* — Blakely Sokoloff Taylor & Zafman LLP

(57) ABSTRACT

A multi-layer optical structure includes a pixel array layer, an addressing matrix layer, and a micro lens array. The pixel array layer includes an array of quantum dot pixels for emitting an image from a first side of the multi-layer optical structure. The addressing matrix layer adjoins the pixel array layer and includes electrically conductive signal lines to individual address and activate the quantum dot pixels to generate the image. The micro lens array includes micro lenses optically aligned with the quantum dot pixels in an emission path of the image to focus the image.

19 Claims, 5 Drawing Sheets

U.S. PATENT DOCUMENTS

| | | | |
|---|---|---|---|
| 7,235,361 | B2 | 6/2007 | Bawendi et al. |
| 7,253,452 | B2 | 8/2007 | Steckel et al. |
| 7,264,527 | B2 | 9/2007 | Bawendi et al. |
| 7,319,709 | B2 | 1/2008 | Sundar et al. |
| 7,326,365 | B2 | 2/2008 | Bawendi et al. |
| 7,332,211 | B1 | 2/2008 | Bulovic et al. |
| 7,449,237 | B2 | 11/2008 | Chan et al. |
| 7,470,379 | B2 | 12/2008 | Anderson et al. |
| 7,470,473 | B2 | 12/2008 | Eisler et al. |
| 7,566,476 | B2 | 7/2009 | Bawendi et al. |
| 7,690,842 | B2 | 4/2010 | Bawendi et al. |
| 7,692,373 | B2 | 4/2010 | Bawendi et al. |
| 7,700,200 | B2 | 4/2010 | Bulovi et al. |
| 7,787,169 | B2 * | 8/2010 | Abramson et al. ............ 359/267 |
| 7,862,892 | B2 | 1/2011 | Chan et al. |
| 8,189,263 | B1 * | 5/2012 | Wang et al. .................. 359/633 |
| 2003/0117369 | A1 * | 6/2003 | Spitzer et al. ................. 345/156 |
| 2004/0108971 | A1 * | 6/2004 | Waldern et al. .................... 345/8 |
| 2005/0128597 | A1 * | 6/2005 | Amanai ......................... 359/621 |
| 2006/0203323 | A1 * | 9/2006 | Tonar et al. .................... 359/265 |
| 2008/0278808 | A1 * | 11/2008 | Redert ........................... 359/478 |
| 2010/0103078 | A1 | 4/2010 | Mukawa et al. |
| 2010/0149073 | A1 | 6/2010 | Chaum et al. |
| 2010/0278480 | A1 | 11/2010 | Vasylyev et al. |
| 2010/0283036 | A1 * | 11/2010 | Coe-Sullivan et al. ......... 257/13 |
| 2011/0007277 | A1 * | 1/2011 | Solomon ........................... 353/7 |
| 2011/0213664 | A1 | 9/2011 | Osterhout et al. |

OTHER PUBLICATIONS

Cakmakci, O. and Rolland, J., "Head-Worn Displays: A Review," Journal of Display Technology, vol. 2, No. 3, Sep. 2006, pp. 199-216.

* cited by examiner

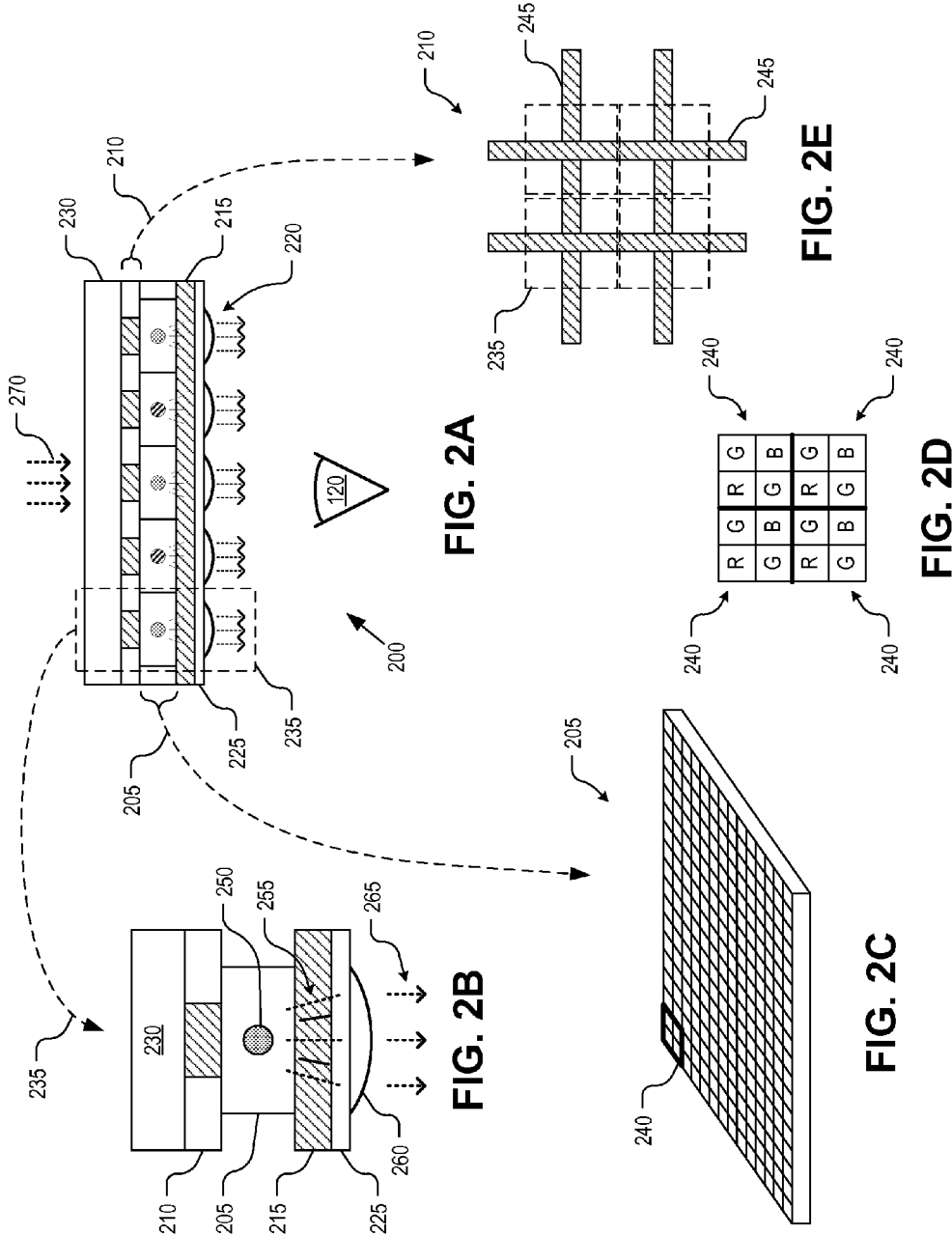

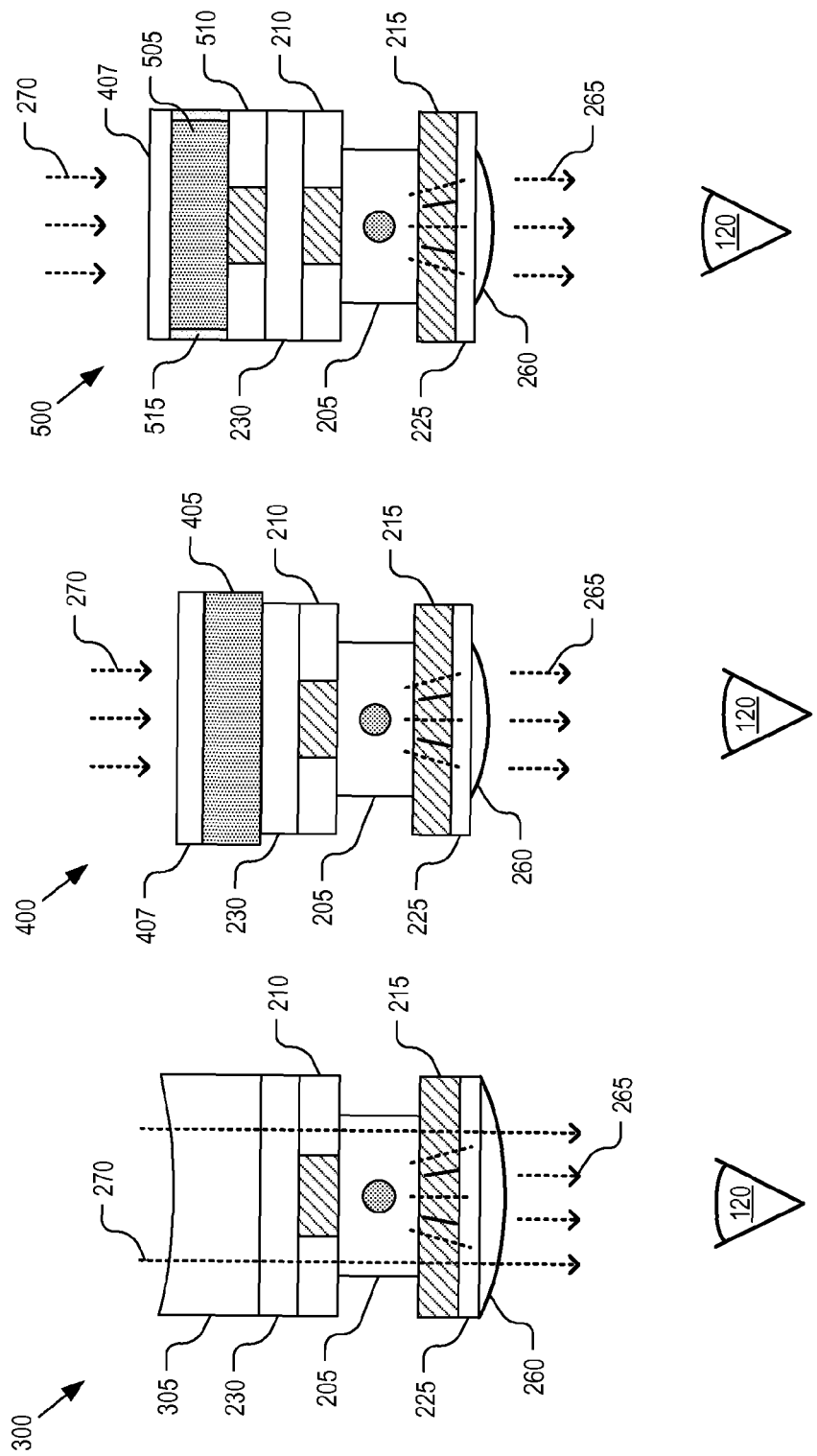

US 8,508,830 B1

QUANTUM DOT NEAR-TO-EYE DISPLAY

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are currently limited due to the cost, size, field of view, eye box, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2A is a cross-sectional view of a multi-layer optical structure including a quantum dot pixel array configured to generate a near-to-eye image, in accordance with an embodiment of the disclosure.

FIG. 2B is a cross-sectional view of an individual pixel cell of a multi-layer optical structure, in accordance with an embodiment of the disclosure.

FIG. 2C is a perspective view of a pixel array layer embedded within a multi-layer optical structure, in accordance with an embodiment of the disclosure.

FIG. 2D is a plan view illustrating four color unit pixels of a quantum dot pixel array, in accordance with an embodiment of the disclosure.

FIG. 2E is a plan view of an addressing matrix layer embedded within a multi-layer optical structure, in accordance with an embodiment of the disclosure.

FIG. 3 is a cross-sectional view of an individual pixel cell including a compensating lens, in accordance with an embodiment of the disclosure.

FIG. 4 is a cross-sectional view of an individual pixel cell including an electrochromic layer for selectively blocking external light, in accordance with an embodiment of the disclosure.

FIG. 5 is a cross-sectional view of an individual pixel cell of multi-layer optical structure that includes an array of electrochromic blocking pixels capable of selectively blocking external light on a per pixel basis, in accordance with an embodiment of the disclosure.

DETAILED DESCRIPTION

Embodiments of an apparatus and system for a near-to-eye display using a quantum dot matrix are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
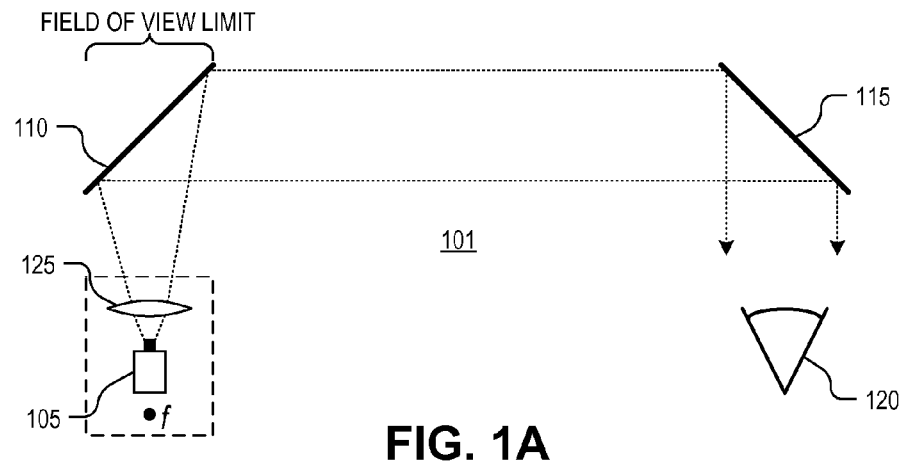
FIG. 1A illustrates a first conventional near-to-eye optical system using an input lens and two minors.

FIG. 1A illustrates a first conventional near-to-eye optical system 101 using an input lens and two minors. An image source 105 outputs an image that is reflected by two minors 110 and 115, which form an image near to eye 120. Image source 105 is typically mounted above the head or to the side of the head, while minors 110 and 115 bend the image around the front of the viewer's face to their eye 120. Since the human eye is typically incapable of focusing on objects placed within a few centimeters, this system requires a lens 125 interposed between the first minor 110 and image source 105. Lens 125 creates a virtual image that is displaced further back from the eye than the actual location of minor 115 by positioning image source 105 inside of the focal point f of lens 125. Optical system 101 suffers from a relatively small field of view (e.g., approximately 20 degrees) limited by the extent of mirrors 110 and 115 and the bulkiness of lens 125. The field of view can be marginally improved by placing minors 110 and 115 within a high index material to compress the angles of incidence, but is still very limited and the thickness of the waveguide rapidly increases to achieve larger fields of view.

Figure 1B:
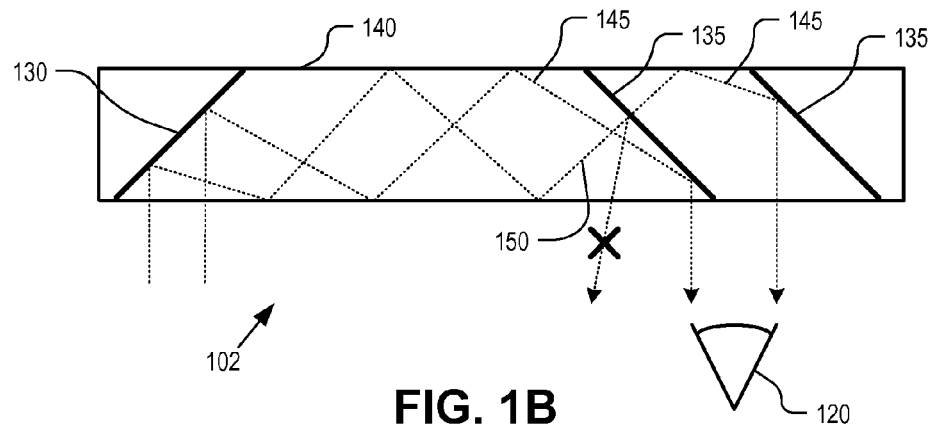
FIG. 1B illustrates a second conventional near-to-eye optical system using angle sensitive dichroic minors.

FIG. 1B illustrates a second conventional near-to-eye optical system 102 using angle sensitive dichroic minors. Optical system 102 includes a single in-coupling minor 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output minors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light incident sufficiently close to normal while reflecting light having a sufficiently oblique incidence. However, the nature of dichroic minors 135 that passes some incident angles while reflecting others limits the field of view optical system 102 and the dichroic minor coating does not provide sharp angular cutoffs, resulting in ghosting effects.

Figure 1C:
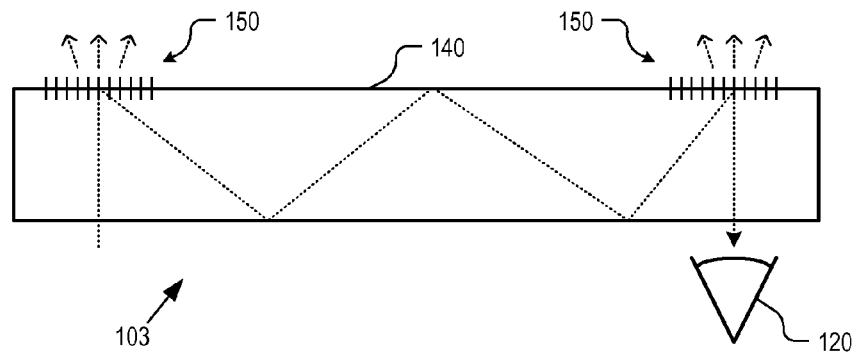
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of minors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly. Again, optical system 103 suffers from a limited field of view.

FIG. 2A is a cross-sectional view of a multi-layer optical structure 200 including a quantum dot pixel array configured to generate a near-to-eye image, in accordance with an embodiment of the disclosure. The illustrated embodiment of multi-layer optical structure 200 includes pixel array layer 205, an addressing matrix layer 210, a common electrode plane 215, a micro lens array 220, and clear films 225 and 230. FIG. 2B illustrates a cross-section of an individual pixel cell 235 within multi-layer optical structure 200. FIG. 2C illustrates a perspective view of pixel array layer 205. FIG. 2D is a block diagram illustrating example color pixel unit cells 240 within an embodiment of pixel array layer 205. FIG. 2E is a plan view illustrating an example layout of electrically conductive signal lines 245 within a portion of addressing matrix layer 210. It should be appreciated that FIGS. 2A-2E are merely demonstrative and not necessarily drawn to scale.

Pixel array layer 205 includes a two-dimensional array or matrix of pixel cells 235. Pixel cells 235 are each capable of emitting light, which corresponds to a pixel within a larger image generated by pixel array layer 205. As illustrated in FIG. 2B, each pixel cell 235 includes quantum dots 250 (only one is illustrated) embedded within pixel array layer 205. Quantum dots 250 may be fabricated as a colloidal suspension or superlattice embedded within a mortar material. For example, the superlattice of quantum dots 250 may be fabricated of InGaN on a GaN substrate. Of course, other materials may be used as well. Since pixel array layer 205 is sandwiched between the adjoining layers—address matrix layer 210 and common electrode plane 215—these layers can be used to electrically pump the individual pixel cells 235 to create electron-hole pairs in the quantum dots. When the electron-hole pairs recombine within the quantum dots, their quantized energy levels will release a photon having a defined wavelength or color corresponding to the band gap energy between the valence and conduction band energy states of the quantum dot.

Light 255 (see FIG. 2B) emitted from each quantum dot 250 is highly divergent, non-collimated light. Accordingly, micro lens array 220 includes a two-dimensional array of micro lenses 260 each optically aligned in the emission path of a given pixel cell 235. In one embodiment, micro lens 260 is a convex refractive lens having a focal distance f. In near-to-eye configurations, where multi-layer optical structure 200 is positioned within 5 cm from eye 120, quantum dots 250 are offset at or less than the focal distance f from micro lenses 260. By doing so, light 265 emitted from multi-layer optical structure 200 can be brought into focus for the user.

In one embodiment, pixel array layer 205 is a color pixel array. For example, the quantum dot matrix may be organized into a Bayer pattern where each color pixel unit cell 240 includes a red pixel, a blue pixel, and two green pixels (e.g., see FIGS. 2C & 2D). Of course, other color pattern schemes (e.g., CYYM, CYGM, etc.) may be implemented as well. Different pixel colors can be achieved by appropriate selection of the sizes (e.g., diameters) and/or materials of quantum dots 250. The color pattern may then be repeated two-dimensionally across the matrix.

Referring to FIG. 2E, addressing matrix layer 210 includes a matrix of electrically conductive signal lines 245 that can be used to address and activate individual pixel cells 235. In one embodiment, address matrix layer 210 provides an active matrix addressing scheme. A pixel cell 235 is excited by driving current through the pixel array layer 205 of the selected pixel cell 235. Accordingly, individual pixel cells 235 may be electrically isolated from adjacent pixel cells 235 via sidewall oxide barriers within pixel array layer 205. The quantum dot structures may be fabricated using a variety of techniques including contact lithography or stamping, self-assembly through templates or dip-pen nanolithography or spin coat films on masked substrates. A multi-color pixel array may be fabricated using a multi-step colloidal deposition along with a mask and release process for each color within the pixel array.

In one embodiment, multi-layer optical structure 200 is a partially transparent or semi-transparent structure that permits external light 270 to pass through and reach eye 120. In one embodiment, each individual sub-layer of multi-layer optical structure 200 is made of optically transmissive materials. For example, signal lines 245 may be fabricated of Indium Tin Oxide (ITO) or other clear conductive materials, while clear films 225 and 230 may be fabricated of glass or flexible plastic films. Similarly, common electrode plane 215 may also be fabricated of ITO or other clear conductive materials. In one embodiment, pixel cells 235 may be fabricated with substantially transparent interstitial gaps that permit external light 270 to pass through multi-layer optical structure 200 between the pixel cells. By fabricating multi-layer optical structure 200 out of transparent, partially transparent, or semi transparent materials, external light 270 is permitted to pass through to reach eye 120. Thus, external light 270 delivers a real world image of the scenery beyond multi-layer optical structure 200, while emitted light 265 output from multi-layer optical structure 200 may provide a superimposed or overlaid computer generated image ("CGI") used to augment the real world image.

Multi-layer optical structure 200 may be a flat planar structure (as illustrated) or fashioned into a curved surface, such as curved eye glasses. The curvature may be achieved as a rigid lens structure (e.g., glass substrate layers) or achieved using a frame that holds flexible substrate layers in a defined shape. Micro lens focal points may be selected to place the virtual image at infinity or some finite focal distance. Field of view may be dictated by the overall array size of the quantum dot pixels while the eyebox may be expanded by staggering and overlapping of the same image across multiple quantum dot pixel sub-arrays.

FIG. 3 is a cross-sectional view of an individual pixel cell 300 including a compensating lens, in accordance with an embodiment of the disclosure. Pixel cell 300 represents just one pixel with a structure that is repeated across an array of pixels of a multi-layer optical structure. Pixel cell 300 is similar to pixel cell 235 (FIG. 2B) except that pixel cell 300 includes compensating lens 305 disposed on the opposite side from micro lens array 220. Compensating lens 305 has optical properties that are complementary to the optical properties of micro lens 260. In other words, compensating lens 305 counteracts the effects of micro lens 260 to reduce distortion of external light 270 as it passes through the multi-layer optical structure. In one embodiment, compensating lens 305 is a convex micro lens structure while micro lens 260 is a concave micro lens structure.

FIG. 4 is a cross-sectional view of an individual pixel cell 400 including a portion of an electrochromic layer, in accordance with an embodiment of the disclosure. Pixel cell 400 represents just one pixel with a structure that is repeated across an array of pixels of a multi-layer optical structure. Pixel cell 400 is similar to pixel cell 235 (FIG. 2B) except that pixel cell 400 includes a portion of an electrochromic layer 405 and transparent backside electrode 407 disposed on the opposite side from micro lens array 220. Electrochromic layer 405 is a single planar layer that extends across the entire pixel array and made of a material that selectively adjusts its opacity by application of an electrical signal (e.g., applied voltage). In one embodiment, electrochromic layer 405 is implemented as a suspended particle device having an electrically controlled opacity. Electrochromic layer 405 may be coupled to control circuitry (not illustrated) that can selectively change its opacity either as a step function (e.g., transparent or opaque) or in multiple steps or degrees of opaqueness. By adjusting the opacity of electrochromic layer 405, external light can be partially or entirely blocked from transmission through the multi-layer optical structure. This adjustable opacity feature can be used to increase the contrast of image light 265 based upon the brightness of the external setting. When the multi-layer optical structure is used as a lens element in a head mounted display ("HMD"), adjusting its opacity can change the mode of operation of the HMD from an augmented reality mode to a pure virtual reality mode to increase user immersion in the virtual environment or eliminate outside distractions.

FIG. 5 is a cross-sectional view of an individual pixel cell 500 including an electrochromic layer, in accordance with an embodiment of the disclosure. Pixel cell 500 represents just one pixel with a structure that is repeated across an array of pixels of a multi-layer optical structure. Pixel cell 500 is similar to pixel cell 400 (FIG. 4) except that pixel cell 500 includes an electrochromic element 505 that is not a shared blanket layer disposed across the entire pixel array. Rather, each pixel of the pixel array includes its own electrochromic element 505 addressable via address matrix layer 510 such that each electrochromic element 505 can be activated or de-activated independent of the other electrochromic elements in surrounding pixel cells. In one embodiment, insulating barrier walls 515 are used to electrically isolate adjacent electrochromic elements 505 within an array of such elements. Address matrix layer 510 includes electrically conductive signals lines for addressing the individual electrochromic elements 505. In one embodiment, addressing matrix layer 510 includes signal lines made of optically clear material, such as ITO.

Figure 6:
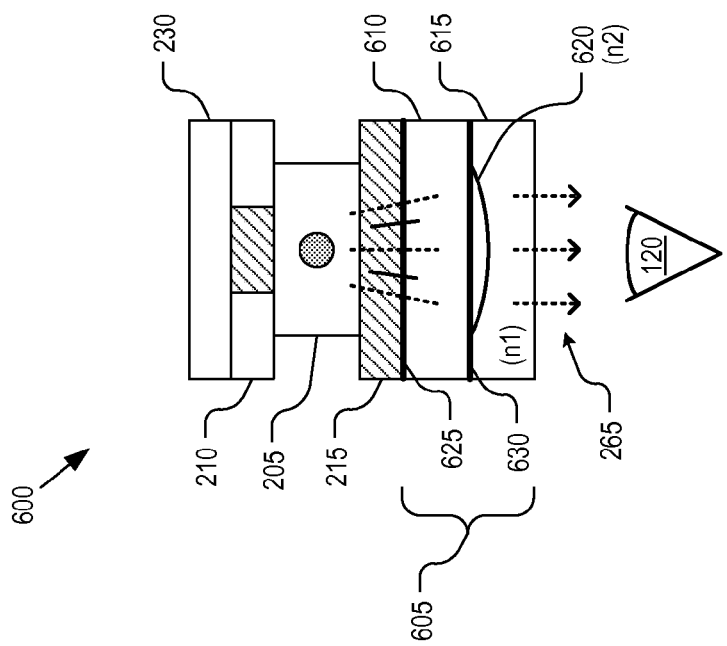
FIG. 6 is a cross-sectional view of an individual pixel cell of a multi-layer optical structure having an adjustable liquid crystal lens array to implement a virtual zoom, in accordance with an embodiment of the disclosure.

FIG. 6 is a cross-sectional view of an individual pixel cell 600 of a multi-layer optical structure having an adjustable liquid crystal lens 605 to implement a virtual zoom, in accordance with an embodiment of the disclosure. Pixel cell 600 represents just one pixel with a structure that is repeated across an array of pixels of a multi-layer optical structure. Pixel cell 600 is similar to pixel cell 235 (FIG. 2) except that pixel cell 600 includes adjustable liquid crystal lens 605 in place of microlens 260. Pixel cell 600 is disposed on the emission side of the multi-layer optical structure and repeated across the pixel array to form an adjustable liquid crystal lens array. It should be appreciated that pixel cell 600 may be adapted to also include electrochromic layer 405 or electrochromic element 505.

The illustrated embodiment of adjustable liquid crystal lens 605 includes a liquid crystal layer 610, a material layer 615 having an index n1, a microlens 620 having an index n2, and electrodes 625 and 630. Material layer 615 is a clear material having a refractive index n1 and microlens 620 is a clear material having a refractive index n2, where n1 does not equal n2. By applying a voltage V across electrodes 625 and 630, the material properties of liquid crystal layer 610 are changed, which changes the lens power of microlens 620. In this manner, liquid crystal lens 605 has an adjustable focal length, which can be dynamically changed to provide an adjustable virtual zoom to the multi-layer optical structure including an array of liquid crystal lenses 605.

Figure 7:
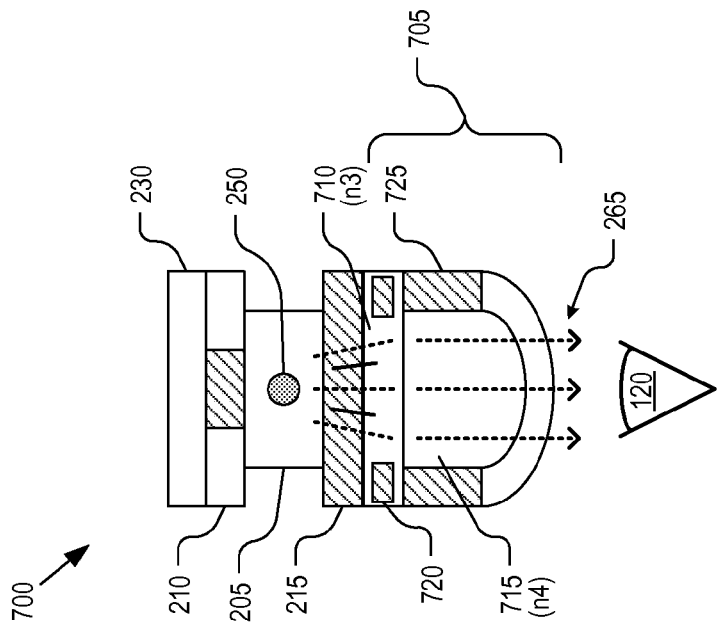
FIG. 7 is a cross-sectional view of an individual pixel cell of a multi-layer optical structure having an electro-wetted lens array to implement a virtual zoom, in accordance with an embodiment of the disclosure.

FIG. 7 is a cross-sectional view of an individual pixel cell 700 of a multi-layer optical structure having an electro-wetted lens 705 to implement a virtual zoom, in accordance with an embodiment of the disclosure. Pixel cell 700 represents just one pixel with a structure that is repeated across an array of pixels of a multi-layer optical structure. Pixel cell 700 is similar to pixel cell 235 (FIG. 2) except that pixel cell 700 includes adjustable electro-wetted lens 705 in place of microlens 260. Pixel cell 700 is disposed on the emission side of the multi-layer optical structure and repeated across the pixel array to form an adjustable electro-wetted lens array. It should be appreciated that pixel cell 700 may be adapted to also include electrochromic layer 405 or electrochromic element 505.

The illustrated embodiment of electro-wetted lens 705 includes liquid materials 710 and 715, having refractive indexes n3 and n4, respectively, and electrode rings 720 and 725. During operation, electrode rings 720 and 725 are charged, which establishes an electrostatic field between these electrodes. Based upon the polarity of the charges, electrode rings 720 and 725 will either be attracted to one another (opposing charges applied to each electrode) or repelled (same charge polarity applied to each electrode). These attraction/repulsion forces cause electro-wetted lens medium 705, which contains charged particles, to bulge in or bulge out, as the case may be, thereby changing the lens properties and producing a variable lens capable of virtual zoom. Electrode rings 720 and 725 may be coupled to control circuitry (not illustrated) to apply the biasing charges. Electrode rings 720 and 725 may be fabricated of an optically transmissive and electrically conductive material.

Figure 8:
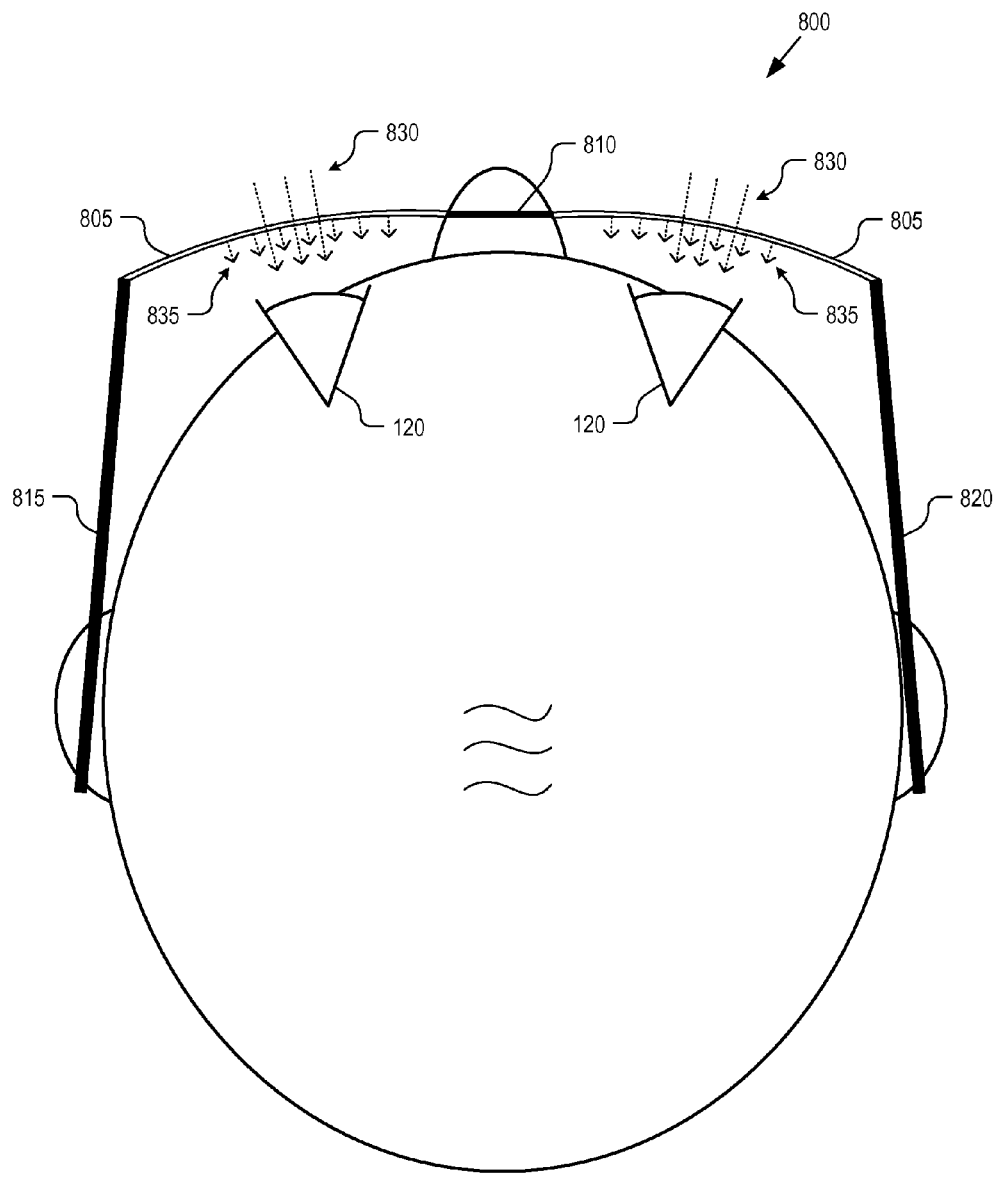
FIG. 8 is a top view of a near-to-eye imaging system using a pair of multi-layer optical structures formed into curved lens, in accordance with an embodiment of the disclosure.

FIG. 8 is a top view of a near-to-eye imaging system 800 using a pair of multi-layer optical structures 805 formed into curved lens, in accordance with an embodiment of the disclosure. Multi-layer optical structure 805 may be implemented with an array of pixel cells, such as any of pixel cells 235, 300, 400, 500, 600, 700, or various combinations thereof. The illustrated embodiment of near-to-eye imaging system 800 includes two curved multi-layer optical structures 805, and a frame assembly including a nose bridge 810, left ear arm 815, and right ear arm 820.

The two curved multi-layer optical structures 805 are secured into an eye glass arrangement that can be worn on the head of a user. The left and right ear arms 815 and 820 rest over the user's ears while nose assembly 810 rests over the user's nose. The frame assembly is shaped and sized to position each curved multi-layer optical structure 805 in front of a corresponding eye 120 of the user with the emission side facing eyes 120. Of course, other frame assemblies may be used (e.g., single, contiguous visor for both eyes, integrated headband or goggles type eyewear, etc.).

The illustrated embodiment is capable of displaying an augmented reality to the user. As such, each multi-layer optical structure 805 is partially transparent and permits the user to see a real world image via external light 830. Left and right (binocular embodiment) CGIs 835 may be generated by one or two image processors (not illustrated) coupled to drive address matrix layers 210 of each multi-layer optical structure 805. Although the human eye is typically incapable of bringing objects within a few centimeters into focus, micro lenses 260, liquid crystal lens 605, or electro-wetted lens 705 bring the image into focus by virtually displacing CGI 835 further back from eyes 120. CGIs 835 are seen by the user as virtual images superimposed over the real world as an augmented reality. Furthermore, the curvature of multi-layer optical structures 805 can be used to improve the field of view and eye box of CGI 835.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A multi-layer optical structure, the multi-layer optical structure comprising:
    a pixel array layer including an array of quantum dot pixels for emitting an image from a first side of the multi-layer optical structure;
    an addressing matrix layer adjoining the pixel array layer including electrically conductive signal lines to individual address and activate the quantum dot pixels to generate the image;
    a micro lens array including micro lenses optically aligned with the quantum dot pixels in an emission path of the image to focus the image; and
    a common electrode plane adjoining the pixel array layer on an opposite side of the pixel array layer as the addressing matrix layer, wherein the common electrode plane extends adjacent to a plurality of the quantum dot pixels, wherein the common electrode plane and the addressing matrix layer selectively electrically pump the array of quantum dot pixels to cause selected quantum dots to generate light,
    wherein the micro lens array is disposed over the common electrode plane and the common electrode plane is disposed between the micro lens array and the pixel array layer,
    wherein the pixel array layer, the addressing matrix layer, and the common electrode plane are at least semi-transparent to permit external light to pass through the multi-layer optical structure and the image emitted from the pixel array layer to pass out through the common electrode plane.

2. The multi-layer optical structure of claim 1, wherein the quantum dot pixels are offset less than a focal distance of the micro lenses from the micro lenses of the micro lens array to focus the image in a near-to-eye configuration of a head mounted display.

3. The multi-layer optical structure of claim 1, wherein the addressing matrix layer and the common electrode plane include indium tin oxide.

4. The multi-layer optical structure of claim 1, further comprising:
    a compensating lens array disposed on a second side of the multi-layer optical structure opposite the first side, the compensating lens array including compensating lenses having first optical properties that counteract second optical properties of the micro lenses of the micro lens array to reduce distortion of the external light as the external light passes through the multi-layer optical structure.

5. The multi-layer optical structure of claim 4, wherein the micro lenses of the micro lens array comprises convex refractive lens structures and the compensating lenses of the compensating lens array comprises concave refractive lens structures.

6. The multi-layer optical structure of claim 1, further comprising:
    an electrochromic layer disposed on an opposite side of the pixel array layer than the micro lens array, the electrochromic layer coupled to control circuitry to selectively adjust an opaqueness of the electrochromic layer to selectively block the external light.

7. The multi-layer optical structure of claim 6, wherein the electrochromic layer comprises an array of electrochromic blocking pixels capable of selectively blocking the external light from passing through selected pixels of the pixel array layer, the multi-layer optical structure further comprising:
    a second address matrix layer adjoining the electrochromic matrix layer including second electrically conductive signal lines to individual address and activate the electrochromic blocking pixels to selectively block the external light.

8. The multi-layer optical structure of claim 1, wherein the array of quantum dot pixels comprises a color pixel array including:
    a first set of quantum dots having a first diameter to generate light of a first color; and
    a second set of quantum dots having a second diameter to generate light of a second color different from the first color,
    wherein the first and second set of quantum dots are organized into a repeating pattern of a two-dimensional array.

9. The multi-layer optical structure of claim 1, wherein the array of quantum dot pixels comprises a color pixel array including:
    a first set of quantum dots made of a first material to generate light of a first color; and a second set of quantum dots made of a second material to generate light of a second color different from the first color, wherein the first and second set of quantum dots are organized into a repeating pattern of a two-dimensional array.

10. The multi-layer optical structure of claim 1, wherein the multi-layer optical structure including the pixel array layer, the addressing matrix layer, and the micro lens array comprises a curved multi-layer optical structure.

11. The multi-layer optical structure of claim 1, wherein micro lens array comprises an adjustable lens array having an adjustable focal length for the micro lenses to adjust a virtual zoom of the multi-layer optical structure.

12. The multi-layer optical structure of claim 11, wherein the micro lens array comprises a liquid crystal lens array disposed over the first side of the multi-layer optical structure.

13. The multi-layer optical structure of claim 11, wherein the micro lens array comprises an electro-wetted lens array disposed over the first side of the multi-layer optical structure.

14. A head mounted display for rendering an image to a user, the head mounted display comprising:
a multi-layer lens structure including:
a pixel array layer including an array of quantum dot pixels for emitting the image from a first side of the multi-layer lens structure;
an addressing matrix layer adjoining the pixel array layer including electrically conductive signal lines to individual address and activate the quantum dot pixels to generate the image;
a micro lens array including micro lenses optically aligned with the quantum dot pixels in an emission path of the image to focus the image in a near-to-eye configuration; and
a common electrode plane adjoining the pixel array layer on an opposite side of the pixel array layer as the addressing matrix layer, wherein the common electrode plane extends adjacent to a plurality of the quantum dot pixels, wherein the common electrode plane and the addressing matrix layer selectively electrically pump the array of quantum dot pixels to cause selected quantum dots to generate light; and
a frame assembly to support the multi-layer lens structure for wearing on a head of the user with the multi-layer lens structure positioned in front of a corresponding eye of the user, wherein the micro lens array is disposed over the common electrode plane and the common electrode plane is disposed between the micro lens array and the pixel array layer, wherein the pixel array layer, the addressing matrix layer, and the common electrode plane are at least semi-transparent to permit external light to pass through the multi-layer optical structure and the image emitted from the pixel array layer to pass out through the common electrode plane.

15. The head mounted display of claim 14, wherein the multi-layer lens structure further comprises:
a compensating lens array disposed on a second side of the multi-layer lens structure opposite the first side, the compensating lens array including compensating lenses having first optical properties that counteract second optical properties of the micro lenses of the micro lens array to reduce distortion of the external light as the external light passes through the multi-layer lens structure.

16. The head mounted display of claim 14, wherein the multi-layer lens structure further comprises:
an electrochromic layer disposed on an opposite side of the pixel array layer than the micro lens array, the electrochromic layer coupled to control circuitry to selectively adjust an opaqueness of the electrochromic layer to selectively block the external light.

17. The head mounted display of claim 16, wherein the electrochromic layer comprises an array of electrochromic blocking pixels capable of selectively blocking the external light from passing through selected pixels of the pixel array layer, the multi-layer lens structure further comprising:
a second address matrix layer adjoining the electrochromic matrix layer including second electrically conductive signal lines to individual address and activate the electrochromic blocking pixels to selectively block the external light.

18. The head mounted display of claim 14, wherein the multi-layer lens structure including the pixel array layer, the addressing matrix layer, and the micro lens array comprises a curved multi-layer lens structure.

19. The head mounted display of claim 14, wherein the micro lens array comprises an adjustable lens array having an adjustable focal length for the micro lenses to adjust a virtual zoom of head mounted display.

* * * * *